United States Patent [19]
Haupt

[11] 3,709,304
[45] Jan. 9, 1973

[54] SWAY ARRESTOR FOR A THREE POINT HITCH

[75] Inventor: Robert C. Haupt, Milwaukee, Wis.

[73] Assignee: Allis-Chalmers Manufacturing Company, Milwaukee, Wis.

[22] Filed: Dec. 28, 1970

[21] Appl. No.: 101,814

[52] U.S. Cl. ................................172/450, 280/474
[51] Int. Cl. ...............................................A01b 59/043
[58] Field of Search ......................280/474; 172/450

[56] References Cited

UNITED STATES PATENTS 3,503,625    3/1970    Muller et al. ....................172/450 X
2,935,147    5/1960    Edman et al. ......................172/450
3,627,060    12/1971   Lemmon ............................172/450
3,047,076    7/1962    Wier et al. ..........................172/450
2,987,126    6/1961    Horney ................................172/450

Primary Examiner—Leo Friaglia
Attorney—Arthur L. Nelson, Kenneth C. McKivett and Robert B. Benson

[57] ABSTRACT

A three point hitch sway arrestor for limiting the lateral sway of the lower draft arms when they are disconnected from an implement and raised to the transport position on the tractor.

10 Claims, 5 Drawing Figures

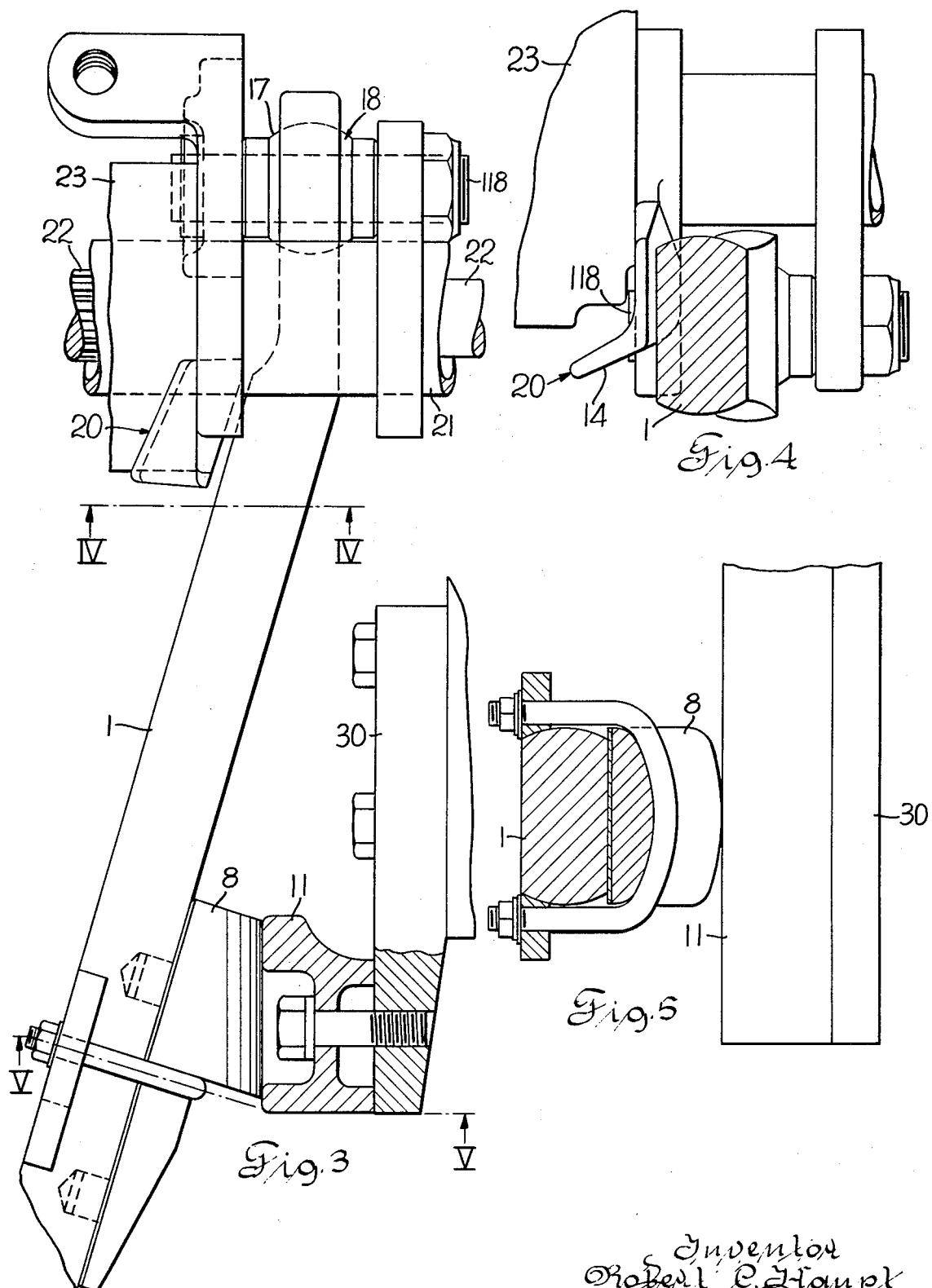

SWAY ARRESTOR FOR A THREE POINT HITCH

This invention relates to a three point hitch and more particularly to a sway limiting device for the lower draft arms of the hitch when the hitch is disconnected from the implement and the draft arms are raised to the transport position.

A draft vehicle which uses a three point hitch is connected to the implement through the hitch while the implement provides a spacing between the rear ends of the lower draft arms. Since the lateral dimension between the rear ends of the lower draft arms is controlled by the implement, the bearing of the draft arms against the side of the hanger brackets for supporting the draw bar prevents the swaying of the implement.

The draft arms are universally connected at their forward ends to the tractor and also connected for power lift through the lift links to the rock arms so that the lower draft arms are free to sway laterally when the implement is disconnected. Accordingly, means such as chains, links, springs, or similar devices have been used when the implement is not attached to the draft arms to limit the swinging movement of the lower draft arms relative to the tractor and prevent the lower draft arms from swinging into the rear tractor tires causing possible damage to the draft arms or tires. These previously used devices have been relatively expensive and required extra parts in an already crowded area to further complicate the structure which has a tendency to interfere with hitch operation. Accordingly, the present invention provides for improved means for guiding the lower draft arms to a sway restricted position when no implement is attached and the draft arms are in the raised transport position.

Accordingly, this invention includes cammed surfaces for engaging the lower draft arms. The cam structure is formed in such a manner that although the lower draft arms are universally connected on their forward end when they are raised with the implement detached they bear against the cam surfaces which biases the arms in an inward direction to move upwardly within confined limits. It is further understood that although the draft arms are not connected together on the rearward ends to maintain a predetermined relative spaced relation the sway blocks connected to the hanger brackets for supporting the draw-bar provide a means whereby the lower draft arms are prevented from swaying inwardly. Accordingly, the arms are confined to a very limited lateral movement between the cam structure on the outer side and the sway blocks on the inner side to maintain limited lateral movement of the lower draft arms when they are raised to the travel position.

Accordingly, it is an object of this invention to provide a sway limiting device for a three point hitch on a tractor.

It is another object of this invention to provide a sway limiter on a three point hitch for a draft vehicle with camming surfaces on the outboard side of the lower draft arms confining the lateral movement during the upward movement of the draft arms with the implement detached.

It is a further object of this invention to provide a sway limiter on a three point hitch wherein means on the rear end of the tractor defines a cammed surface for camming the lower draft arms inwardly while the sway blocks prevent excessive inward swaying movement of the draft arms when the implement is detached and the lower draft arms are raised into the transport position.

The objects of this invention are provided by connecting two draft arms for universal connection on the forward end. Means supporting the draft arms is formed with cammed surfaces which engage the outboard side of the draft arms as they are raised from the operating position to the transport position when no implement is attached to the draft arms. Sway blocks positioned on the inner side of the draft arms also assist in maintaining a substantially vertical movement of the draft arms as they engage the sway blocks. Accordingly, the lateral movement of the draft arms is arrested by the cammed structure and the sway blocks to prevent excessive swaying movement of the draft arms in the upper transport position.

Referring to the drawings, the drawings illustrate the preferred embodiment of this invention.

FIG. 3 is an enlarged view partially in section taken on line III—III of FIG. 2.

FIG. 4 is a view taken on line IV—IV of FIG. 3.

FIG. 5 is a view taken on line V—V of FIG. 3.

Figure 1:
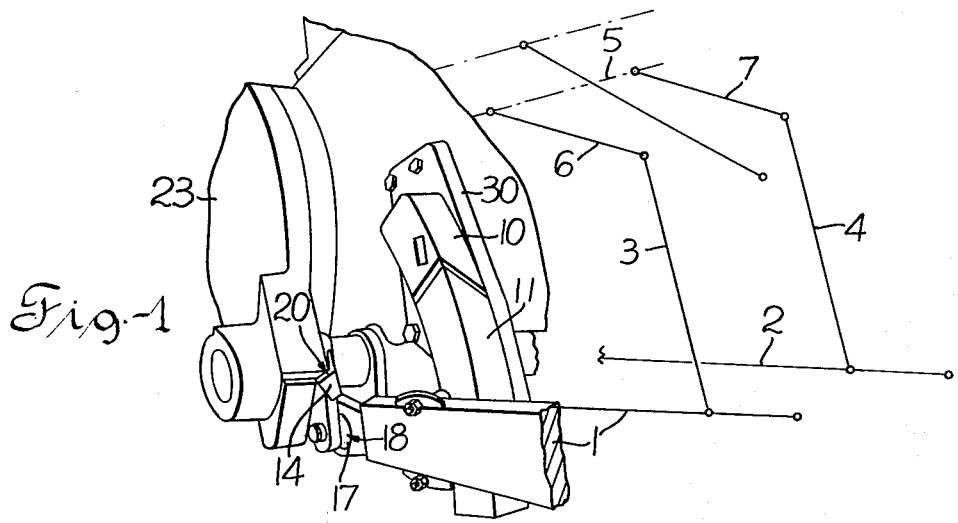
FIG. 1 illustrates a three point hitch on a tractor.

Referring to FIG. 1 a three point hitch is shown mounted on the tractor. Lower draft arms 1 and 2 are universally connected on the forward ends to the chassis of the tractor. Draft arm 1 is shown connected to spherical surface 17 on the spherical sleeve 18. Each draft arm is connected to a lift link 3 and 4 respectively. The rock shaft 5 carrying the rock arms 6 and 7 raise the lift links 3 and 4 and the draft arms 1 and 2 respectively.

As the lower draft arms 1 and 2 are raised, the wear plate 8 engages the two piece sway block 10 and 11. The sway blocks 10 and 11 define a substantially vertical surface which limits the inward swaying movement of arm 1. Upon the raising of the lower draft arms if they are swung to an outward lateral position they will be cammed inwardly by the camming surfaces. The left hand rear axle housing carries the lever 19 which forms the cam 20 on the portion that extends downwardly to support arm 1. Cam 20 defines a cammed surface 14 converging inwardly and upwardly which biases the lower draft arm 1 to a laterally inward position as it is raised to the transport position. Since the right and left hand sides of the tractor are symmetrical it is believed adequate to describe only the left hand side.

The lever 19 is carried on the torsion tube 21 which in turn is fastened to the torsion bar 22. The torsion tube 21 encircles the torsion bar 22 and is journaled on both ends in the rear axle housing 23. The lever 19 forms an eccentric mounting for the pin 118 on the left hand side and a similarly mounted pin on the right hand side causing a rotational movement on the torsion tube 21 under draft load. The torque applied to the torsion tube 21 is transmitted to torsion bar 22 when a draft load is applied to the lower draft arms.

The operation of the device will be described in the following paragraphs.

When the rock shaft 5 is pivoted the rock arms 6 and 7 lift the links 3 and 4 to raise the lower draft arms 1 and 2. The lower draft arm 1 moves upwardly and is cammed inwardly by the cam surface 14 and is also engaged on its inner surface through the wear plate 8 by the sway blocks 10 and 11. With the draft arms in the raised transport position, the lateral sway is arrested by the cams and the sway blocks.

When the lower draft arms 1 and 2 are in the lowered position which is normally the operating position they are below the cams. In this position, the implement controls the spacing between the rear ends of the draft arms 1 and 2. With the spacing between the draft arms fixed the sway blocks on the sides of the hanger bracket 30 controls the swaying movement of the implement during operation.

Figure 2:
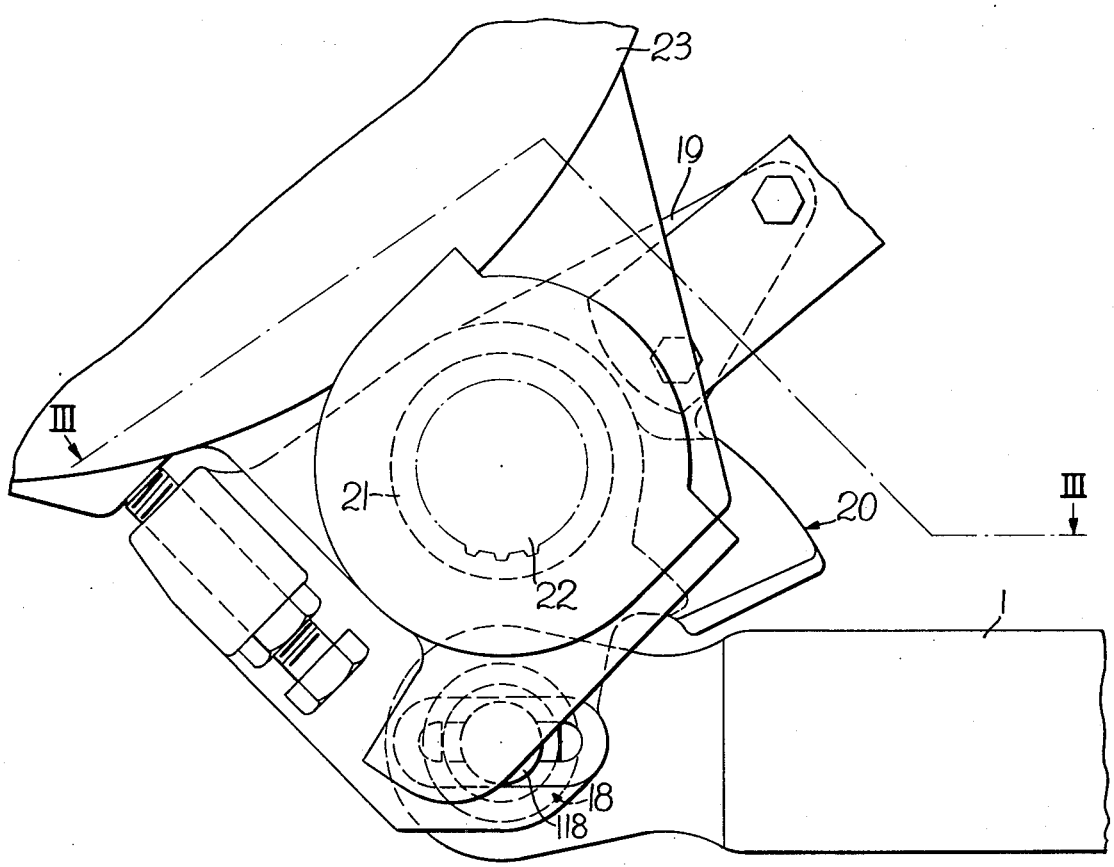
FIG. 2 is an enlarged side view of the forward portion of the draft arms and sway restricter.

When the implement is detached, however, the draft arms are free to sway. Their swaying movement inwardly is still confined by the sway blocks. The lateral outward movement of the draft arms in this position is not limited since they are then free to sway outwardly and engage the tires and possibly cause damage to the lower draft arms or the tires. Accordingly, the draft arms are lifted when the implement is detached. With the lifting of the draft arms each draft arm is cammed by a mating cam surface which biases the draft arm to a laterally inward position as shown. It is noted that the cam 20 extends outward sufficiently to engage the draft arm and cause it to be biased inwardly as it is raised. The sway blocks continue to engage the draft arm on the inward side. The upward movement is then confined between the vertical portion of the cammed surface and the cam supporting means and the sway blocks 10, 11 and swaying is arrested in the raised or transport position as shown in FIG. 2.

The embodiments of the invention in which an exclusive property or privilege is claimed are defined as follows:

1. A sway limiting device for use with a vehicle three point hitch comprising, a pair of rock arms, a pair of lower draft arms, connecting means adapted for universally connecting said lower draft arms to a vehicle, a single lift link connected between each one of said rock arms and its mating lower draft arm, inner sway limiting means between said draft arms limiting the inward sway of said draft arms, cam means defining a curved surface in spaced relation rearwardly from said connection and outwardly of each of said lower draft arms to thereby engage said arms and cam inwardly and confine said lower draft arms to a laterally confined movement when said draft arms are pivotally raised.

2. A sway limiting device for use with a vehicle three point hitch as set forth in claim 1 wherein said cam means defines said surface divergent outwardly and downwardly for camming said lower draft arms inwardly when said draft arms are pivotally raised.

3. A sway limiting device for use with a vehicle three point hitch as set forth in claim 1 wherein said cam means defines said surface positioned upwardly and rearwardly of said connecting means to thereby permit lateral sway of the draft arms when said draft arms are in the lowered position.

4. A sway limiting device for use in a vehicle three point hitch as set forth in claim 1 wherein said inner sway limiting means includes hanger bracket means inward of said draft arms, said hanger bracket means including sway blocks limiting the inward sway of said draft arms when said draft arms are pivotally raised.

5. A sway limiting device for use with a vehicle three point hitch as set forth in claim 4 wherein said sway blocks define a substantially vertical surface to thereby confine the vertical movement of the draft arms substantially between said cam means and said sway blocks.

6. A sway limiting device for use with a vehicle three point hitch as set forth in claim 1 wherein said connecting means defines a ball and socket permitting said lower draft arms to pivot laterally in their lower position and to move to a pivotally raised position.

7. A sway limiting device for use in a vehicle three point hitch as set forth in claim 1 wherein said inner sway limiting means means includes a draw bar hanger bracket positioned intermediate said draft arms, sway blocks removably fastened to said hanger bracket defining a substantially vertical surface to limit the lateral inward swaying movement of said draft arms when said draft arms are pivoted to the raised position.

8. A sway limiting device for use in a vehicle three point hitch as set forth in claim 1 wherein said cam means defines said curved surface converging inwardly and upwardly and supporting means supporting said cam means defining a substantially vertical surface continuous with said curved surface extending upwardly to confine said draft arms to a substantially vertical movement when said draft arms are raised.

9. A sway limiting device for use in a vehicle three point hitch as set forth in claim 1 including means positioning said cam means for engaging the forward portion of each of said draft arms when said draft arms are pivotally raised.

10. A sway limiting device for use with a vehicle three point hitch as set forth in claim 1 including journal means for supporting a torsion bar, means connecting said lower draft arms eccentrically to said torsion bar, means fastening said cam means to said journal means to thereby cam said lower draft arms inwardly when said draft arms are raised.

* * * * *